US009444115B2

(12) United States Patent
Okuyoshi

(10) Patent No.: US 9,444,115 B2
(45) Date of Patent: Sep. 13, 2016

(54) FUEL CELL SYSTEM WITH CALCULATION OF LIQUID WATER VOLUME

(75) Inventor: Masahiro Okuyoshi, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 147 days.

(21) Appl. No.: 13/696,469

(22) PCT Filed: May 2, 2011

(86) PCT No.: PCT/IB2011/000926
§ 371 (c)(1),
(2), (4) Date: Nov. 6, 2012

(87) PCT Pub. No.: WO2011/138654
PCT Pub. Date: Nov. 10, 2011

(65) Prior Publication Data
US 2013/0052545 A1   Feb. 28, 2013

(30) Foreign Application Priority Data

May 7, 2010   (JP) .................. 2010-107381

(51) Int. Cl.
*H01M 8/04* (2016.01)

(52) U.S. Cl.
CPC ..... *H01M 8/04992* (2013.01); *H01M 8/04492* (2013.01); *H01M 8/04589* (2013.01); *H01M 8/04753* (2013.01); *H01M 8/0432* (2013.01); *H01M 8/0438* (2013.01); *Y02E 60/50* (2013.01)

(58) Field of Classification Search
CPC ................... H01M 8/04492; H01M 8/04992; H01M 8/04589; H01M 8/04753; H01M 8/0432; H01M 8/0438; Y02E 60/50

USPC ......................................... 429/400
See application file for complete search history.

(56) References Cited

U.S. PATENT DOCUMENTS

2006/0257719 A1* 11/2006 Merzougui et al. ............ 429/44
2007/0026276 A1*  2/2007 Ogawa et al. ................. 429/22
(Continued)

FOREIGN PATENT DOCUMENTS

EP    2 158 631 A2    3/2010
JP    07-235324 A     9/1995
(Continued)

OTHER PUBLICATIONS

English Translation of JP 2005-222854 A.*
(Continued)

*Primary Examiner* — Nicholas P D'Aniello
*Assistant Examiner* — Philip A Stuckey
(74) *Attorney, Agent, or Firm* — Kenyon & Kenyon LLP

(57) ABSTRACT

A fuel cell system includes: a fuel cell that generates electricity by reaction between reaction gases; an electricity amount calculating unit that calculates an amount of electricity generated during a voltage drop of the fuel cell from a current generated during the voltage drop; a reaction gas substance amount calculating unit that calculates an amount of substance of at least one of the reaction gases in the fuel cell on the basis of the amount of electricity generated during the voltage drop; a gas volume calculating unit that calculates a gas volume in the fuel cell on the basis of the amount of substance of the at least one of the reaction gases; and a liquid water volume calculating unit that subtracts the gas volume from a fluid flow passage volume in the fuel cell to calculate a liquid water volume in the fuel cell.

6 Claims, 4 Drawing Sheets

(56) References Cited

U.S. PATENT DOCUMENTS

| | | | |
|---|---|---|---|
| 2009/0155651 A1* | 6/2009 | Orihashi | 429/22 |
| 2010/0119898 A1* | 5/2010 | Imai | H01M 8/04156 429/430 |
| 2010/0167146 A1* | 7/2010 | Takeguchi | H01M 8/04007 429/432 |
| 2011/0250519 A1* | 10/2011 | Okuyoshi | H01M 8/04119 429/447 |

FOREIGN PATENT DOCUMENTS

| | | | | |
|---|---|---|---|---|
| JP | 2005-108673 A | | 4/2005 | |
| JP | 2005-222854 A | | 8/2005 | |
| JP | 2005222854 A | * | 8/2005 | ............. H01M 8/04 |
| JP | 2006-278168 A | | 10/2006 | |
| JP | 2006-338921 A | | 12/2006 | |
| JP | 2007-035389 A | | 2/2007 | |
| JP | 2008-004432 A | | 1/2008 | |
| JP | 2008-140734 A | | 6/2008 | |
| JP | WO 2008140131 A1 | * | 11/2008 | ........ H01M 8/04156 |
| JP | WO 2010073381 A1 | * | 7/2010 | ........ H01M 8/04119 |

OTHER PUBLICATIONS

J.P. Hoare, On the interaction of oxygen with platinum, Electrochimica Acta, vol. 27, Issue 12, Dec. 1982, pp. 1751-1761.*
International Search Report and Written Opinion of PCT/IB2011/000926 mailed Aug. 3, 2011.

* cited by examiner

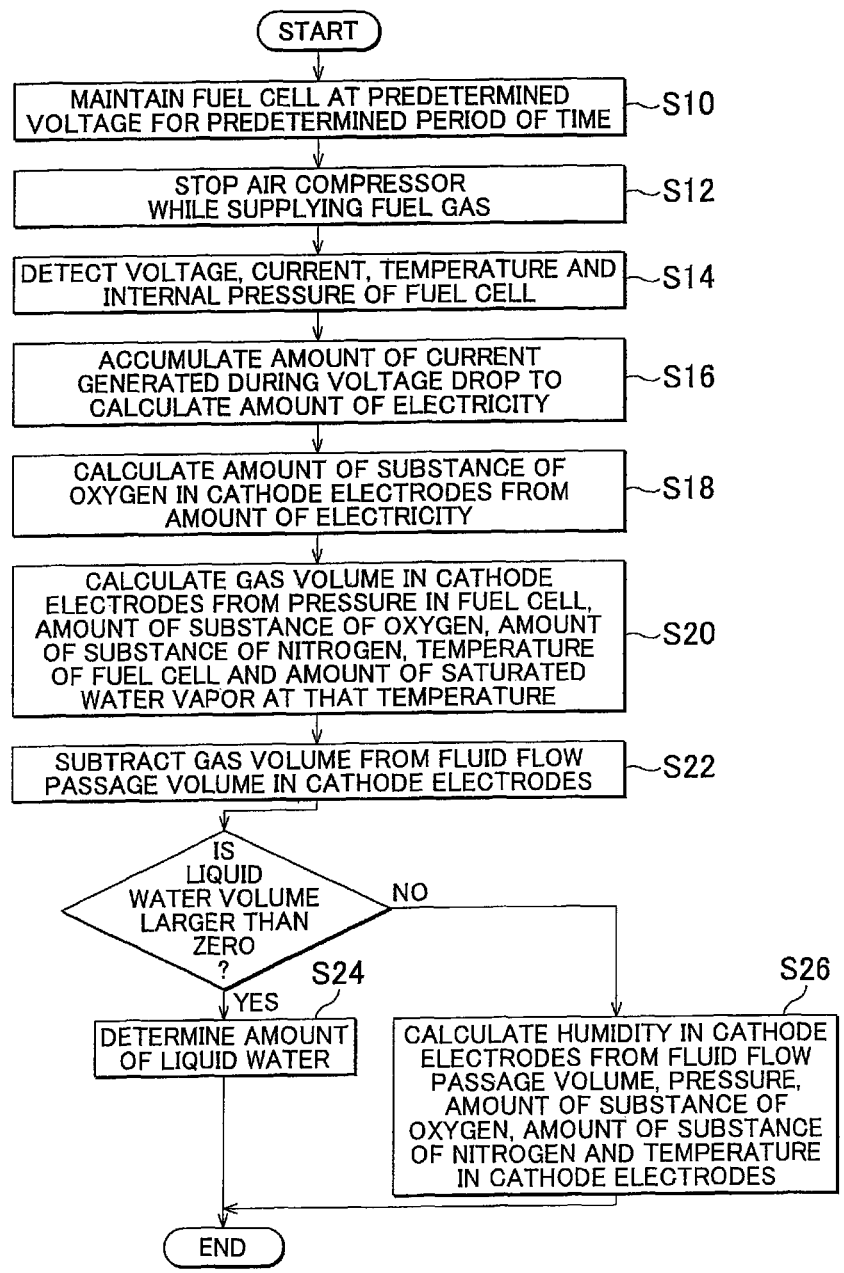

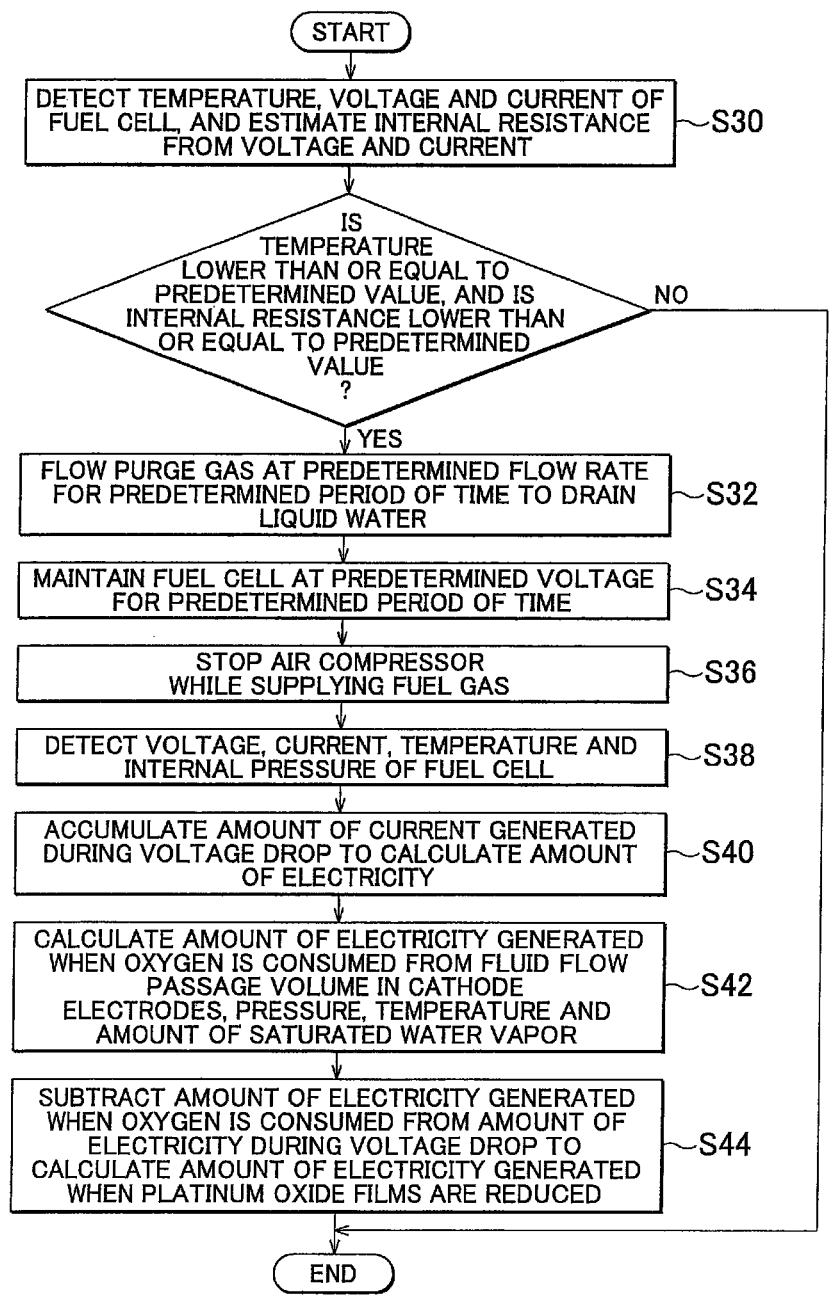

FUEL CELL SYSTEM WITH CALCULATION OF LIQUID WATER VOLUME

BACKGROUND OF THE INVENTION

This is a 371 national phase application of PCT/IB2011/000926 filed 02 May 2011, claiming priority to Japanese Patent Application No. 2010-107381 filed 07 May 2010, the contents of which are incorporated herein by reference.

1. Field of the Invention

The invention relates to a technique for a fuel cell system that detects the amount of liquid water in a fuel cell.

2. Description of the Related Art

A fuel cell is, for example, formed so that a membrane electrode assembly formed by sandwiching both surfaces of an electrolyte membrane with an anode electrode and a cathode electrode is further sandwiched with a pair of separators to form a single cell and then a plurality of the single cells are stacked on top of each other. Fuel gas containing hydrogen is introduced into the anode electrodes of the fuel cell and oxidant gas, such as air (oxygen), is introduced into the cathode electrodes of the fuel cell to generate electricity by the electrochemical reaction between hydrogen and oxygen to thereby produce water.

Incidentally, during operation of the fuel cell, produced water is primarily produced in the cathode electrodes, and water content in each cathode electrode migrates to the anode electrode via the electrolyte membrane interposed between the cathode electrode and the anode electrode. Therefore, liquid water remains in the fuel cell at the time when power generation of the fuel cell is stopped, and, when power generation is stopped while leaving the remaining liquid water, water may freeze to damage the electrolyte membranes, or the like, in usage under a low-temperature environment, such as in cold climate areas and in winter. Then, purge gas is introduced into the anode electrodes and the cathode electrodes to perform purge process at the time when power generation of the fuel cell is stopped.

In a fuel cell system according to a related art, purge process is performed at a predetermined constant set amount at the time when power generation is stopped, so purge is sometimes performed for an unnecessarily long period of time. This may, for example, degrade the electrolyte membranes to decrease the performance of power generation.

Purge is performed after power generation is stopped and it is necessary to use energy stored in an electrical storage device, so, when purge process is carried out for an unnecessarily long period of time as described above, extra electric power in the electrical storage device is consumed and, therefore, for example, required electric power may run short at the time of a subsequent start-up of the fuel cell.

Then, it is desirable that the amount of liquid water in the fuel cell is estimated and then the purge process for the fuel cell is carried out on the basis of the estimated amount of liquid water, so a technique for estimating the amount of liquid water in the fuel cell is also suggested in the related art. For example, Japanese Patent Application Publication No. 2007-35389 (JP-A-2007-35389) describes a technique for estimating the amount of liquid water in the fuel cell on the basis of an accumulated value of generated current.

In addition, for example, Japanese Patent Application Publication No. 2006-338921 (JP-A-2006-338921) describes a technique for estimating the amount of liquid water in the fuel cell on the basis of a voltage difference in the fuel cell.

In addition, for example, Japanese Patent Application Publication No. 2006-278168 (JP-A-2006-278168) describes a technique for estimating the amount of liquid water in the fuel cell on the basis of a humidity and a pressure loss in the fuel cell and a technique for estimating the amount of liquid water in the fuel cell on the basis of the amount of produced water, a fuel cell temperature, an outside air temperature, a fuel cell load and an operation history.

In addition, for example, Japanese Patent Application Publication No. 2005-108673 (JP-A-2005-108673) describes a technique for estimating the degree of flooding by statistically processing the voltages of the fuel cell.

In addition, for example, Japanese Patent Application Publication No. 7-235324 (JP-A-7-235324) describes a technique for estimating the degree of flooding on the basis of the impedance of the fuel cell.

However, in the methods according to the above related arts, the voltage, humidity, pressure loss, or the like, of the fuel cell is poor sensitive, and multiple errors cannot be corrected using an operation history, or the like, so it is difficult to accurately estimate the amount of liquid water in the fuel cell.

SUMMARY OF INVENTION

The invention provides a fuel cell system that is able to accurately estimate the amount of liquid water in a fuel cell.

An aspect of the invention provides a fuel cell system. The fuel cell system includes: a fuel cell that generates electricity by reaction between reaction gases; an electricity amount calculating unit that calculates an amount of electricity generated during a voltage drop of the fuel cell from a current generated during the voltage drop; a reaction gas substance amount calculating unit that calculates an amount of substance of at least one of the reaction gases in the fuel cell on the basis of the amount of electricity generated during the voltage drop; a gas volume calculating unit that calculates a gas volume in the fuel cell on the basis of the amount of substance of the at least one of the reaction gases; and a liquid water volume calculating unit that subtracts the gas volume from a fluid flow passage volume in the fuel cell to calculate a liquid water volume in the fuel cell.

In the above aspect, the gas volume calculating unit may substitute the amount of substance of the at least one of the reaction gases, an amount of saturated water vapor, a temperature of the fuel cell and a pressure in the fuel cell into the equation of state of gas to calculate the gas volume.

In the above aspect, when the liquid water volume is smaller than or equal to zero, the liquid water volume calculating unit may substitute the amount of substance of the at least one of the reaction gases, the fluid flow passage volume in the fuel cell, the temperature of the fuel cell and the pressure in the fuel cell into the equation of state of gas to calculate a humidity in the fuel cell.

In the above aspect, the amount of electricity generated during the voltage drop may include an amount of electricity generated when the at least one of the reaction gases is consumed and an amount of electricity generated when an oxide film formed on a catalyst of a catalyst layer that constitutes the fuel cell is reduced, and the electricity amount calculating unit may calculate an amount of electricity generated when the at least one of the reaction gases is consumed at the time when the liquid water volume in the fuel cell is zero, and may subtract the calculated amount of electricity generated when the at least one of the reaction gases is consumed from the amount of electricity generated during the voltage drop to calculate the amount of electricity generated when the oxide film formed on the catalyst is reduced.

According to the aspect of the invention, it is possible to accurately estimate the amount of liquid water in the fuel cell.

BRIEF DESCRIPTION OF DRAWINGS

The features, advantages, and technical and industrial significance of this invention will be described below with reference to the accompanying drawings, in which like numerals denote like elements, and wherein:

FIG. 3 is a flowchart that shows an example of operation of the fuel cell system according to the embodiment; and FIG. 4 is a flowchart that shows an example of a method of calculating the amount of electricity generated when oxide films formed on catalysts are reduced.

DETAILED DESCRIPTION OF EMBODIMENTS

Hereinafter, an embodiment of the invention will be described.

Figure 1:
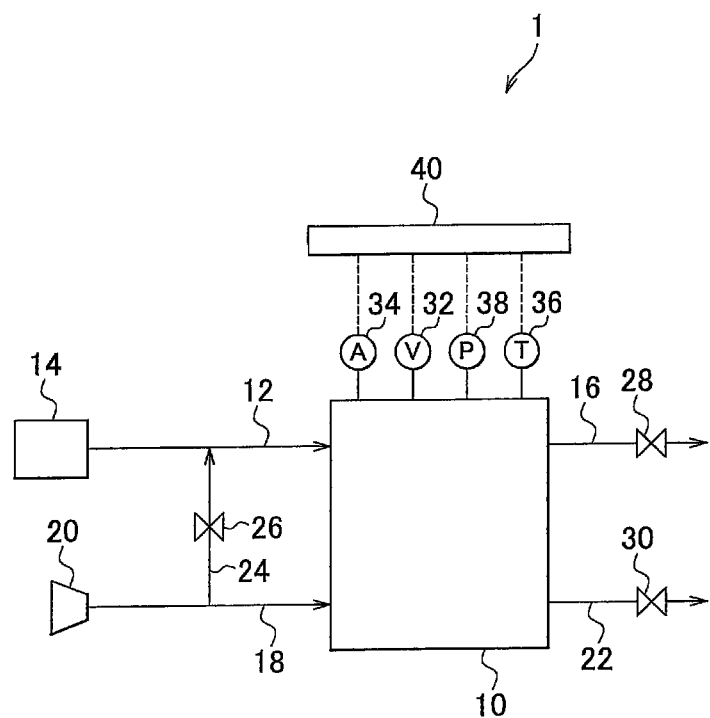
FIG. 1 is a schematic view that shows an example of the configuration of a fuel cell system according to an embodiment.

FIG. 1 is a schematic view that shows an example of the configuration of a fuel cell system according to the present embodiment. As shown in FIG. 1, the fuel cell system 1 includes a fuel cell 10 (stack) in which a plurality of single cells are stacked. Each single cell includes a membrane electrode assembly (MEA) and a pair of separators. The MEA is formed so that both surfaces of an electrolyte membrane are sandwiched by an anode electrode and a cathode electrode. The pair of separators sandwich the MEA. One of the pair of separators has fuel gas flow passage grooves on a surface facing the anode electrode of the MEA. Fuel gas containing hydrogen gas flows through the fuel gas flow passage grooves. The fuel gas flow passage grooves of each single cell are in fluid communication with the fuel gas flow passage grooves of the other singles cells via a manifold, and the like. In addition, the other one of the pair of separators has oxidant gas flow passage grooves, on a surface facing the cathode electrode of the MEA. Oxidant gas, such as air, flows through the oxidant gas flow passage grooves. The oxidant gas flow passage grooves of each single cell are in fluid communication with the oxidant gas flow passage grooves of the other single cells via a manifold, and the like.

Each electrolyte membrane is, for example, made of a solid polymer, or the like, having a sulfonic acid group as an ion exchange group, and is formed in a thin film shape. The anode electrodes and the cathode electrodes each have a catalyst layer and a diffusion layer that are arranged in order of the catalyst layer and the diffusion layer from the side adjacent to the electrolyte membrane. Each catalyst layer is formed by mixing carbon supporting a catalyst, such as platinum and a platinum-based alloy, with an electrolyte, or the like, and is deposited on the diffusion layer or the electrolyte membrane. Each diffusion layer is, for example, a conductive porous material, such as carbon paper and carbon cloth, that is subjected to surface treatment, such as water repellent treatment.

As shown in FIG. 1, an anode inlet (not shown) of the fuel cell 10 is connected to a fuel gas tank 14 via a fuel gas supply passage 12. Therefore, fuel gas containing hydrogen is supplied from the anode inlet into the fuel cell 10 via the fuel gas supply passage 12. Then, fuel gas passes through the fuel gas flow passage grooves of the separators and the diffusion layers, and is supplied to the catalyst layers of the anode electrodes; and is then used for power generation of the fuel cell 10. On the other hand, a fuel gas exhaust passage 16 is connected to an anode outlet (not shown) of the fuel cell 10. Therefore, fuel gas (anode exhaust gas) used for power generation passes through the fuel gas flow passage grooves and is exhausted to the fuel gas exhaust passage 16.

In addition, as shown in FIG. 1, a cathode inlet (not shown) of the fuel cell 10 is connected to an air compressor 20 via an oxidant gas supply passage 18. Therefore, oxidant gas, such as air, is supplied from the cathode inlet into the fuel cell 10 via the oxidant gas supply passage 18. Then, oxidant gas passes through the oxidant gas flow passage grooves of the separators and the diffusion layers, and is supplied to the catalyst layers of the cathode electrodes, and is then used for power generation of the fuel cell 10. On the other hand, an oxidant gas exhaust passage 22 is connected to a cathode outlet (not shown) of the fuel cell 10. Therefore, oxidant gas (cathode exhaust gas) used for power generation passes through the oxidant gas flow passage grooves and is exhausted to the oxidant gas exhaust passage 22.

The fuel cell system 1, for example, has a communication passage 24 that connects the fuel gas supply passage 12 to the oxidant gas supply passage 18 in order to purge liquid water in the fuel cell 10. When purge process is carried out, the air compressor 20 is operated, and valves 26, 28 and 30 provided respectively in the communication passage 24, the fuel gas exhaust passage 16 and the oxidant gas exhaust passage 22 are opened. By so doing, purge gas (air) is supplied into the fuel cell 10 through the fuel gas supply passage 12 and the oxidant gas supply passage 18 to make it possible to purge liquid water in the fuel cell 10. Similarly, the valves 26 and 28 provided respectively in the communication passage 24 and the fuel gas exhaust passage 16 are opened, and the valve 30 provided in the oxidant gas exhaust passage 22 is closed. By so doing, purge gas is supplied to only the anode electrodes of the fuel cell 10 to make it possible to purge liquid water in the anode electrodes. In addition, the valve 26 provided in the communication passage 24 is closed, and the valve 30 provided in the oxidant gas exhaust passage 22 is opened. By so doing, purge gas is supplied to only the cathode electrodes of the fuel cell 10 to make it possible to purge liquid water in the cathode electrodes. Note that the open-close of these valves 26, 28 and 30 are carried out by a control unit 40. In addition, the purge method using the communication passage 24 is described above; however, it may be configured not using the communication passage 24. When the communication passage 24 is not used, air may be supplied to the cathode electrodes as purge gas when only the cathode electrodes are purged. In addition, when the communication passage 24 is not used and only the anode electrodes are purged, hydrogen may be supplied to the anode electrodes as purge gas.

A voltage sensor 32, a current sensor 34, a temperature sensor 36 and an internal pressure sensor 38 are installed in the fuel cell 10. The, voltage sensor 32 detects the voltage of the fuel cell 10. The current sensor 34 detects the current flowing through the fuel cell 10. The temperature sensor 36 detects the temperature of the fuel cell 10. The internal pressure sensor 38 detects the pressure in the fuel cell 10 (at least one of the pressure in the anode electrodes and the pressure in the cathode electrodes). In addition, the sensors are electrically connected to the control unit 40, and data detected by the sensors are transmitted to the control unit 40.

The control unit 40 electronically controls the fuel cell system 1, and is formed of a central processing unit (CPU), a read only memory (ROM), a random access memory (RAM), various interfaces, an electronic circuit, and the like.

The control unit 40 includes an electricity amount calculating unit, a reaction gas substance amount calculating unit, a gas volume calculating unit and a liquid water volume calculating unit.

The control unit 40 calculates the amount of electricity generated during a voltage drop of the fuel cell 10 from a current generated during the voltage drop (functions as an electricity amount calculating unit). When the voltage of the fuel cell 10 is dropped, the control unit 40 may hold the fuel cell 10 generating power at a predetermined voltage for a predetermined period of time. After that, the control unit 40 controls a converter (not shown) and an inverter (not shown) that are connected to the fuel cell 10 to drop the voltage of the fuel cell 10. At this time, when the amount of water content in the cathode electrodes is calculated, the air compressor 20 may be stopped to stop supply of oxidant gas (air) to the cathode electrodes while maintaining supply of fuel gas to the anode electrodes. In addition, when the amount of water content in the anode electrodes is calculated, supply of fuel gas to the anode electrodes may be stopped while supply of oxidant gas (air) to the cathode electrodes is maintained. By so doing, it is possible to improve the accuracy of calculating the amount of liquid water in the fuel cell 10.

Figure 2A:
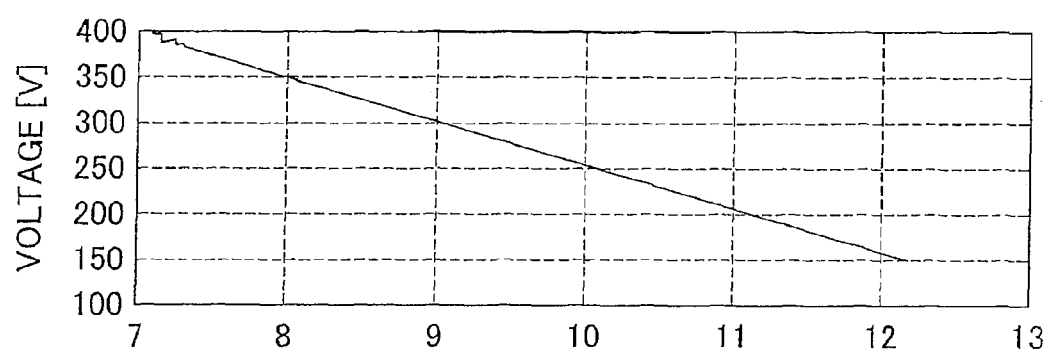
FIG. 2A is a graph that shows the correlation between the voltage during a voltage drop and the elapsed time.
Figure 2B:
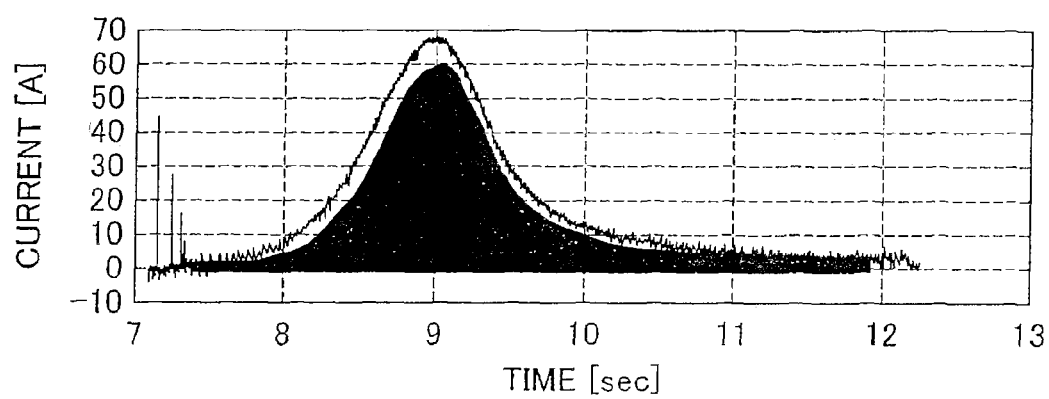
FIG. 2B is a graph that shows the correlation between the current generated during a voltage drop and the elapsed time.

FIG. 2A is a graph that shows the correlation between the voltage during the voltage drop and the elapsed time. FIG. 2B is a graph that shows the correlation between the current generated during the voltage drop and the elapsed time. The control unit 40 accumulates a current generated during the voltage drop shown in FIG. 2B on the basis of data transmitted from the voltage sensor 32 and the current sensor 34 during the voltage drop to calculate the amount of electricity generated during the voltage drop. A method of calculating the amount of electricity generated during a voltage drop of the fuel cell 10 is not necessarily limited to a method that accumulates a current. For example, the amount of electricity generated during the voltage drop may be estimated from a peak value of a current shown in FIG. 2B, or the amount of electricity generated during the voltage drop may be estimated from a current after a predetermined period of time from a peak value of a current. By so doing, it is possible to calculate the amount of electricity generated during the voltage drop in a short period of time.

The control unit 40 calculates the amount of substance of at least one of reaction gases in the fuel cell 10 (including only the amount of substance of hydrogen in the anode electrodes or only the amount of substance of oxygen in the cathode electrodes) on the basis of the amount of electricity generated during the voltage drop (functions as a reaction gas substance amount calculating unit). The main factors in generating current during the voltage drop as shown in FIG. 2A and FIG. 2B are as follows.

(1) current generated when oxygen in the cathode electrodes reacts ($4H^+ + O_2 + 4e^- \rightarrow 2H_2O$) and when hydrogen in the anode electrodes reacts ($2H_2 \rightarrow 4H^+ + 4e^-$) (hereinafter, simply referred to as (1))

(2) current generated when oxide films formed on catalysts are reduced (for example, $PtO + 2H^+ + 2e^- \rightarrow Pt + H_2O$ or $PtOH + H^+ + e^- \rightarrow Pt + H_2O$) (hereinafter, simply referred to as (2))

(3) current generated when an electric double layer capacitance that occurs in the fuel cell 10 is discharged (hereinafter, simply referred to as (3))

Thus, the amount of electricity generated during the voltage drop is mostly the sum of the amounts of electricity generated owing to the above (1) to (3). Then, the amounts of electricity generated owing to (2) and (3) are constant when the fuel cell 10 is not degraded, so they may be set as predetermined values. Thus, by subtracting the predetermined values from the calculated amount of electricity generated during the voltage drop, the amount of electricity generated owing to (1) is calculated and is then converted to the amount of substance of oxygen or the amount of substance of hydrogen on the basis of the above reaction formula. Note that, for the cathode, when oxygen initially in the cathode electrodes is consumed, air flows into the cathode electrodes from the outside by that volume and then oxygen of 21% of the air is consumed, after which these are repeated. Thus, the calculated amount of substance of oxygen is the amount of substance of oxygen consumed during the voltage drop, so the amount of substance of oxygen may be divided by a predetermined constant ($1.27 \approx 1 + 0.21 + 0.21^2 + 0.21^3 + \ldots$) to be corrected to the amount of substance of oxygen initially in the fuel cell 10 at the time when the voltage is dropped.

In addition, because the amounts of electricity generated owing to (2) and (3) are constant, a map that represents the correlation between the amount of electricity generated during the voltage drop and the amount of electricity generated owing to (1) may be stored in the control unit 40 in advance and then the map may be consulted for the calculated amount of electricity generated during the voltage drop to calculate the amount of electricity generated owing to (1).

The control unit 40 calculates the gas volume in the fuel cell 10 (including only the gas volume in the anode electrodes or only the gas volume in the cathode electrodes) on the basis of the amount of substance of the at least any one of the reaction gases (functions as a gas volume calculating unit). Specifically, using the equation of state of gas (using the following equation (a) when the amount of substance of oxygen is calculated or using the following equation (b) when the amount of substance of hydrogen is calculated); the gas volume in the fuel cell 10 is calculated.

$$P_c V_c = (n_{N2} + n_{O2} + n_{H2O}) R \times T \qquad (a)$$

$$P_a V_a = (n_{H2} + n_{H2O}) R \times T \qquad (b)$$

Here, $P_c$ is a pressure in the cathode electrodes, $P_a$ is a pressure in the anode electrodes, $V_c$ is a gas volume in the cathode electrodes, $V_a$ is a gas volume in the anode electrodes, n is the amount of substance, R is a gas constant, and T is the temperature of the fuel cell 10.

The control unit 40 substitutes pressure data ($P_c$, $P_a$) transmitted from the internal pressure sensor 38 during the voltage drop, the calculated amount of substance of oxygen ($n_{O2}$) or the calculated amount of substance of hydrogen ($n_{H2}$), the amount of substance of nitrogen ($nN_2$) that is obtained by multiplying the amount of substance of oxygen by the percentage of nitrogen (0.71) in air, temperature data (T) transmitted from the temperature sensor 36 and the amount of saturated water vapor ($n_{H2O}$) at that temperature into the above equation to calculate the gas volume in the fuel cell 10 (which may be only the gas volume in the anode electrodes or only the gas volume in the cathode electrodes). The amount of saturated water vapor ($n_{H2O}$) is calculated using a map that represents the correlation between the temperature and the amount of saturated water vapor.

In the present embodiment, to accurately calculate the gas volume in the fuel cell 10, the equation of state of gas may be used as described above. In addition, the gas volume in the fuel cell 10 may be calculated in such a manner that the map that represents the correlation between the amount of substance of at least one of the reaction gases and the gas volume in the fuel cell 10 is employed and then the map is consulted for the calculated amount of substance of the at least one of the reaction gases. When the above map that represents the correlation between the amount of substance of the at least one of the reaction gases and the gas volume in the fuel cell 10 is used, the following method may be taken in consideration of the dependency of the gas volume on the temperature and pressure in the fuel cell 10. For example, maps that represent the correlations between the amount of substance of the at least one of the reaction gases and the gas volume in the fuel cell 10 at some fuel cell temperatures may be prepared. Alternatively, maps that represent the correlations between the amount of substance of the at least one of the reaction gases and the gas volume in the fuel cell 10 at some pressures in the fuel cell 10 may be prepared.

The control unit 40 subtracts the calculated gas volume in the fuel cell 10 from the fluid flow passage volume in the fuel cell 10 to calculate the liquid water volume in the fuel cell 10 (including only the liquid water volume in the anode electrodes or only the liquid water volume in the cathode electrodes) (functions as a liquid water volume calculating unit). Here, the fluid flow passage volume in the fuel cell 10 is a predetermined value, and is, for example, the volume of gas flow passages formed in the separators of the fuel cell 10, the volume of pores of the diffusion layers of the fuel cell 10, and the like. When the liquid water volume in the anode electrodes is calculated, for example, the gas volume in the anode electrodes is subtracted from the volume of the fuel gas flow passages of the separators and the volume of pores of the diffusion layers on the side of the anode electrodes. In addition, when the liquid water volume in the cathode electrodes is calculated, for example, the gas volume in the cathode electrodes is subtracted from the volume of oxidant gas flow passages of the separators and the volume of pores of the diffusion layers on the side of the cathode electrodes.

Thus, it is possible to accurately calculate the amount of liquid water in the fuel cell 10. Then, it is possible to determine the duration of purge process, the flow rate of purge gas (air) supplied at the time of purge process, and the like, on the basis of the amount of liquid water in the fuel cell 10 or it is possible to calculate a pressure loss in the fuel cell 10 on the basis of the amount of liquid water. In addition, the present embodiment is able to calculate the amount of liquid water in the fuel cell 10 as described above at any time where necessary. Note that when the fuel cell 10 is stopped in order to improve the accuracy of calculating the amount of liquid water, the amount of liquid water in the fuel cell 10 may be calculated in a state where no load is exerted on the fuel cell 10, such as during intermittent operation of the fuel cell 10 and during idling of the vehicle.

Incidentally, for example, when the temperature of the fuel cell 10 or the ambient temperature is high, produced water in the fuel cell 10 may not exist as liquid water (may exist in a state of gas). Then, in the present embodiment, in the equation of state of gas used to calculate the gas volume in the fuel cell 10, $n_{H2O}$ is calculated at the amount of saturated water vapor. That is, when there is no liquid water in the fuel cell 10, $n_{H2O}$ is calculated at the amount of saturated water vapor irrespective of the fact that water vapor in air is not saturated, so, when the volume of liquid wafer in the fuel cell 10 is calculated by subtracting the calculated gas volume in the fuel cell 10 from the fluid flow passage volume in the fuel cell 10, the resultant value may be lower than or equal to zero.

In the present embodiment, normally, when the calculated volume of liquid water in the fuel cell 10 is lower than or equal to zero, the control unit 40 determines that there is no liquid water in the fuel cell 10 to end calculation of liquid water; however, the humidity in the fuel cell 10 may be calculated by the following method. By so doing, the humidity in the fuel cell 10 may be calculated without installing a humidity sensor.

When the calculated liquid water volume in the fuel cell 10 is smaller than or equal to zero, the liquid water volume is zero, so the predetermined fluid flow passage volume in the fuel cell 10 may be regarded as the gas volume. That is, the control unit 40 substitutes the predetermined fluid flow passage volume ($V_c$, $V_a$) in the fuel cell 10, pressure data ($P_c$, $P_a$) transmitted from the internal pressure sensor 38 during the voltage drop, the calculated amount of substance of oxygen ($n_{O2}$) or the calculated amount of substance of hydrogen ($n_{H2}$), the amount of substance of nitrogen ($nN_2$) that is obtained by multiplying the percentage of nitrogen (0.71) in air by the amount of substance of oxygen and temperature data (T) transmitted from the temperature sensor 36 into the above equation (a) or (b) to calculate the amount of water vapor in the fuel cell 10. Then, the calculated amount of water vapor is divided by the amount of saturated water vapor at the temperature detected by the temperature sensor 36 to make it possible to calculate the humidity in the fuel cell 10.

FIG. 3 is a flowchart that shows an example of operation of the fuel cell system according to the present embodiment. Here, the amount of liquid water in the cathode electrodes is calculated. As shown in FIG. 3, in step S10, the control unit 40 executes control so as to maintain the fuel cell 10 generating power at a predetermined voltage for a predetermined period of time. In step S12, the control unit 40 stops the air compressor 20 while supplying fuel gas to thereby drop the voltage of the fuel cell 10. In step S14, the voltage, current, temperature and internal pressure of the fuel cell 10 during the voltage drop are detected respectively by the voltage sensor 32, the current sensor 34, the temperature sensor 36 and the internal pressure sensor 38. In step S16, the control unit 40 accumulates a current generated during the voltage drop to calculate the amount of electricity generated during the voltage drop on the basis of data transmitted from the voltage sensor 32 and the current sensor 34. In step S18, the control unit 40 subtracts a predetermined value (the amount of electricity generated when oxide films formed on the catalysts are reduced and the amount of electricity generated when an electric double layer capacitance is discharged) from the amount of electricity generated during the voltage drop to calculate the amount of electricity at the time when oxygen gas is consumed. Then, the amount of electricity generated at the time when oxygen gas is consumed is converted to the amount of substance of oxygen, and the resultant value is further divided by the predetermined value (1.27) to calculate the amount of substance of oxygen in the cathode electrodes during the voltage drop. In step S20, the control unit 40 substitutes pressure data ($P_c$) transmitted from the internal pressure sensor 38, the calculated amount of substance of oxygen ($n_{O2}$), the amount of substance of nitrogen ($nN_2$), temperature data (T) transmitted from the temperature sensor 36 and the amount of saturated water vapor ($n_{H2O}$) at the calculated temperature using the map that represents the correlation between the temperature and the amount of water vapor into the above equation (a) to calculated the gas volume in the cathode electrodes. In step S22, the control unit 40 subtracts the calculated gas volume in the cathode electrodes from the predetermined fluid flow passage volume in the cathode electrodes (the volume of gas flow passages of the separators and the volume of pores of the diffusion layers on the side of the cathode electrodes) to calculate the liquid water volume in the cathode electrodes.

Then, when the calculated liquid water volume in the cathode electrodes exceeds zero, the control unit 40 proceeds to step S24 and then determines the calculated liquid water volume as the amount of liquid water present in the cathode electrodes. Note that it is applicable that the correlation between the amount of liquid water in the cathode electrodes and the amount of liquid water in the fuel cell 10 as a whole is defined by a map in advance and then the map is consulted for the calculated amount of liquid water in the cathode electrodes to estimate the amount of liquid water in the fuel cell 10 as a whole.

On the other hand, when the calculated amount of liquid water in the cathode electrodes is lower than or equal to zero, the control unit 40 proceeds to step S26 and substitutes the predetermined fluid flow passage volume ($V_c$) in the cathode electrodes, pressure data ($P_c$) transmitted from the internal pressure sensor 38, the calculated amount of substance of oxygen ($n_{O2}$), the amount of substance of nitrogen ($nN_2$) and temperature data (T) transmitted from the temperature sensor 36 into the above equation (a) to calculate the amount of water vapor in the cathode electrodes, and then calculates the humidity in the cathode electrodes from the calculated amount of water vapor. Note that it is applicable that the correlation between the humidity in the cathode electrodes and the humidity in the fuel cell 10 as a whole is defined as a map in advance and then the map is consulted for the calculated humidity in the cathode electrodes to estimate the humidity in the fuel cell 10 as a whole.

In addition, when the amount of liquid water in the anode electrodes is calculated, the control unit 40 executes control so as to maintain the fuel cell 10 generating power at a predetermined voltage for a predetermined period of time and then stops supply of fuel gas from the fuel gas tank 14 while supplying oxidant gas by the air compressor 20 to thereby drop the voltage of the fuel cell 10. Then, the fuel cell system 1 is operated as in the case of the above to make it possible to calculate the amount of liquid water or humidity in the anode electrodes. In addition, as in the case of the above, it is possible to estimate the amount of liquid water or humidity in the fuel cell 10 as a whole from the amount of liquid water or humidity in the anode electrodes.

In the present embodiment, when the amount of substance of oxygen in the cathode electrodes is calculated, the amount of electricity generated when the oxide films formed on the catalysts are reduced is set as a predetermined value; however, when the fuel cell 10 is used for a long period of time, the catalysts degrade and, as a result, the amount of electricity generated when the oxide films formed on the catalysts are reduced varies, so the predetermined value may be corrected.

The amount of electricity generated during the voltage drop is (1) the amount of electricity generated when oxygen in the cathode electrodes reacts, (2) the amount of electricity generated when the oxide films formed on the catalysts are reduced and (3) the amount of electricity generated when an electric double layer capacitance is discharged. Then, when the amount of electricity of (3) is set as a predetermined value and, in addition, the amount of electricity of (1) is calculated, the amount of electricity of (1) and (3) is subtracted from the amount of electricity generated during the voltage drop to make it possible to calculate the amount of electricity of (2).

Here, to calculate the amount of electricity of (1), it is necessary to set liquid water in the cathode electrodes to zero. When liquid water in the cathode electrodes is zero, the gas volume in the cathode electrodes may be replaced with the fluid flow passage volume in the cathode electrodes, so the control unit 40 is able to calculate the amount of electricity of (1) as follows. The control unit 40 substitutes the predetermined fluid flow passage volume ($V_c$) in the cathode electrodes, pressure data ($P_c$) transmitted from the internal pressure sensor 38, temperature data (T) transmitted from the temperature sensor 36 and the amount of saturated water vapor ($n_{H2O}$) calculated using the map that represents the correlation between the temperature and the amount of water vapor into the above equation (a) to calculate the amount of substance of oxygen in the cathode electrodes. Here, in the cathode electrodes, when oxygen initially in the cathode electrodes is consumed, air flows in from the outside by that volume, and oxygen of 21% of the air is consumed, after which these are repeated, so the calculated amount of substance of oxygen is multiplied by the predetermined constant ($1.27 \approx 1+0.21+0.21^2+0.21^3+\ldots$) to calculate the amount of substance of oxygen consumed in the cathode electrodes. Then, on the basis of the reaction formula of oxygen in the cathode electrodes ($4H^+ + O_2 + 4e^- \rightarrow 2H_2O$), the calculated amount of substance of consumed oxygen is converted to the amount of electricity (the amount of electricity of (1)) generated when oxygen gas is consumed. Then, the control unit 40 subtracts the amounts of electricity of (1) and (3) from the amount of electricity generated during the voltage drop to calculate the amount of electricity of (2). By so doing, the predetermined amount of electricity of (2) may be corrected. Note that this may also be calculated similarly for the side of the anode electrodes. In addition, in the present embodiment, the amount of electricity of (3) is set as a predetermined value; however, an electric double layer capacitance is discharged at the end, so in the graph of FIG. 2B that represents the correlation between the current generated during the voltage drop and the elapsed time, for example, an accumulated value of a current in a flat region (11 seconds to 12 seconds) after the current has decreased may be calculated as the amount of electricity of (3).

FIG. 4 is a flowchart that shows an example of a method of calculating the amount of electricity generated when the oxide films formed on the catalysts are reduced. As shown in FIG. 4, in step S30, the control unit 40 uses the temperature sensor 36 to detect the temperature of the fuel cell 10, and also uses the voltage sensor 32 and the current sensor 34 to detect the voltage and current of the fuel cell 10 and then estimates the internal resistance on the basis of the voltage and the current. Note that a method of estimating or detecting the internal resistance is not specifically limited; a method of estimating or detecting the internal resistance according to the related arts or a general method of estimating or detecting the internal resistance may be employed. When the detected temperature is lower than or equal to a predetermined value and the internal resistance is lower than or equal to a predetermined value, the control unit 40 proceeds to step S32; whereas when the above conditions are not satisfied, the control unit 40 cancels the subsequent operation. When the temperature of the fuel cell 10 is high or the internal resistance is high, water vapor in the cathode electrodes cannot be regarded as saturated water vapor, and there is a concern that the accuracy of calculating the amount of electricity becomes poor, so the above temperature condition and internal resistance condition may be set.

In step S32, the control unit 40 operates the air compressor 20 at a predetermined flow rate for a predetermined period of time to drain all the liquid water in the cathode electrodes. In step S34, the control unit 40 executes control so as to maintain the fuel cell 10 generating power at a predetermined voltage for a predetermined period of time. In step S36, the control unit 40 stops the air compressor 20 while supplying fuel gas to thereby drop the voltage of the fuel cell 10. In step S38, the voltage, current, temperature and internal pressure of the fuel cell 10 during the voltage drop are detected respectively by the voltage sensor 32, the current sensor 34, the temperature sensor 36 and the internal pressure sensor 38. In step S40, the control unit 40 accumulates a current generated during the voltage drop to calculate the amount of electricity generated during the voltage drop on the basis of data transmitted from the voltage sensor 32 and the current sensor 34. In step S42, the control unit 40 substitutes the predetermined fluid flow passage volume ($V_c$) in the cathode electrodes, pressure data ($P_c$) transmitted from the internal pressure sensor 38, temperature data (T) transmitted from the temperature sensor 36 and the amount of saturated water vapor ($n_{H2O}$) calculated using the map that represents the correlation between the temperature and the amount of water vapor into the above equation (a) to calculate the amount of substance of oxygen in the cathode electrodes. Then, the calculated amount of substance of oxygen is multiplied by the predetermined value (1.27) to calculate the amount of substance of oxygen consumed in the cathode electrodes, and, on the basis of the reaction formula of oxygen in the cathode electrodes ($4H^+ + O_2 + 4e^- \rightarrow 2H_2O$), the calculated amount of substance of consumed oxygen is converted to the amount of electricity generated when oxygen gas is consumed. In step S44, the control unit 40 subtracts the calculated amount of electricity generated when oxygen gas is consumed and the predetermined value (the amount of electricity generated when an electric double layer capacitance is discharged) from the amount of electricity generated during the voltage drop to calculate the amount of electricity generated when the oxide films formed on the catalysts are reduced. The above calculating method is not limited to the side of the cathode electrodes; it may also be similarly applied to the side of the anode electrodes.

The invention claimed is:

1. A fuel cell system comprising:
   a fuel cell that generates electricity by reaction between reaction gases including oxidant gas and fuel gas;
   a plurality of sensors to sense voltage, current, temperature, and internal pressure;
   an electricity amount calculating unit that calculates an amount of electricity generated during a voltage drop of the fuel cell from a current generated during the voltage drop;
   a reaction gas substance amount calculating unit that calculates an amount of substance of at least any one of the reaction gases in the fuel cell on the basis of the amount of electricity generated during the voltage drop;
   a gas volume calculating unit that calculates a gas volume in the fuel cell on the basis of the amount of substance of the at least any one of the reaction gases;
   a liquid water volume calculating unit that subtracts the gas volume from a fluid flow passage volume in the fuel cell to calculate a liquid water volume in the fuel cell, and
   a control unit that includes a central processing unit, a read only memory, a random access memory, a plurality of interfaces, and an electronic circuit, the control unit is programmed to:
      stop supply of the oxidant gas to a cathode electrode of the fuel cell while maintaining supply of the fuel gas to an anode electrode of the fuel cell when the liquid water volume calculating unit calculates the liquid water volume in the cathode electrode, and
      stop the supply of the fuel gas to the anode electrode while maintaining the supply of the oxidant gas to the cathode electrode when the liquid water volume calculating unit calculates the liquid water volume in the anode electrode.

2. The fuel cell system according to claim 1, wherein the gas volume calculating unit calculates the gas volume on the basis of the amount of substance of the at least any one of the reaction gases, an amount of saturated water vapor, a temperature of the fuel cell and a pressure in the fuel cell.

3. The fuel cell system according to claim 1, wherein the gas volume calculating unit substitutes the amount of substance of the at least one of the reaction gases, an amount of saturated water vapor, a temperature of the fuel cell and a pressure in the fuel cell into an equation of state of gas to calculate the gas volume.

4. The fuel cell system according to claim 2, wherein, when the liquid water volume is equal to about zero, the liquid water volume calculating unit calculates a humidity in the fuel cell on the basis of the amount of substance of the at least one of the reaction gases, the fluid flow passage volume in the fuel cell, the temperature of the fuel cell and the pressure in the fuel cell.

5. The fuel cell system according to claim 2, wherein, when the liquid water volume is equal to about zero, the liquid water volume calculating unit substitutes the amount of substance of the at least one of the reaction gases, the fluid flow passage volume in the fuel cell, the temperature of the fuel cell and the pressure in the fuel cell into an equation of state of gas to calculate a humidity in the fuel cell.

6. The fuel cell system according to claim 1, wherein
   the amount of electricity generated during the voltage drop includes an amount of electricity generated when the at least one of the reaction gases is consumed and an amount of electricity generated when an oxide film formed on a catalyst of a catalyst layer that constitutes the fuel cell is reduced, and
   the electricity amount calculating unit calculates an amount of electricity generated when the at least one of the reaction gases is consumed at the time when the liquid water volume in the fuel cell is zero, and subtracts the calculated amount of electricity generated when the at least one of the reaction gases is consumed from the amount of electricity generated during the voltage drop to calculate the amount of electricity generated when the oxide film formed on the catalyst is reduced.

* * * * *